(12) United States Patent
Wade et al.

(10) Patent No.: US 8,213,100 B2
(45) Date of Patent: Jul. 3, 2012

(54) LENS DRIVE DEVICE

(75) Inventors: Tatsuki Wade, Nagano (JP); Akihito Wada, Nagano (JP)

(73) Assignee: Nidec Sankyo Corporation (JP)

( * ) Notice: Subject to any disclaimer, the term of this patent is extended or adjusted under 35 U.S.C. 154(b) by 346 days.

(21) Appl. No.: 12/692,694

(22) Filed: Jan. 25, 2010

(65) Prior Publication Data

US 2010/0188760 A1    Jul. 29, 2010

(30) Foreign Application Priority Data

Jan. 23, 2009    (JP) .................................. 2009-012480

(51) Int. Cl.
*G02B 7/02*    (2006.01)
(52) U.S. Cl. ......... 359/824; 359/819; 359/822; 359/823
(58) Field of Classification Search ..................... 310/13; 359/819, 822–824; 360/264.7, 264.9, 266.7, 360/266.9

See application file for complete search history.

(56) References Cited

U.S. PATENT DOCUMENTS 7,986,478 B2 *    7/2011    Yamashita et al. ............ 359/824

FOREIGN PATENT DOCUMENTS

JP    2008-58659 A    3/2008

* cited by examiner

*Primary Examiner* — Ricky Mack
*Assistant Examiner* — Mahidere Sahle
(74) *Attorney, Agent, or Firm* — Cantor Colburn LLP

(57) ABSTRACT

A lens drive device may include a movable body holding a lens and a drive mechanism for driving the movable body in the optical axis direction. The drive mechanism may include a drive magnet part formed in a substantially triangular prism shape which is disposed at least one of four corners of the lens drive device, a drive coil wound around in a substantially triangular tube shape so that its inner peripheral face is oppositely disposed to an outer peripheral face of the drive magnet part through a gap space, and a magnetic member which is disposed on an object side with respect to the drive coil. The magnetic member is attracted toward an intermediate position of the drive magnet part in the optical axis direction.

22 Claims, 9 Drawing Sheets

LENS DRIVE DEVICE

CROSS REFERENCE TO RELATED APPLICATION

The present invention claims priority under 35 U.S.C. §119 to Japanese Application No. 2009-12480 filed Jan. 23, 2009, the entire contents of which are incorporated herein by reference.

FIELD OF THE INVENTION

An embodiment of the present invention may relate to a lens drive device which is mounted on a relatively small camera or imager used in a cellular phone or the like.

BACKGROUND OF THE INVENTION

A lens drive device for driving a photographing lens for a camera or imager mounted on a cellular phone or the like has been conventionally known, which includes a movable lens body, which holds a plurality of lenses and which is moved in an optical axis direction, and a fixed body which movably holds the movable lens body through two flat springs (see, for example, Japanese Patent Laid-Open No, 2008-58659). In this lens drive device, a drive coil is wound around an outer peripheral face of a cylindrical sleeve which structures the movable lens body. Further, in this lens drive device, four magnets are disposed so as to face an outer peripheral face of the drive coil.

In recent years, in the market of a camera or imager used in a cellular phone or the like, demand for downsizing of a camera or imager has been remarkably increased. Therefore, demand for downsizing of a lens drive device which is mounted on the camera or imager has been also remarkably increased. On the other hand, in recent years, in the market of a camera or imager used in a cellular phone or the like, demand for high pixel density and high resolution has become higher and thus a diameter of a lens which is mounted on the lens drive device is liable to be larger. Therefore, it is difficult to make the lens drive device smaller.

SUMMARY OF THE INVENTION

In view of the problem described above, at least an embodiment of the present invention may advantageously provide a lens drive device whose shape when viewed in the optical axis direction of a lens is substantially rectangular and whose size is capable of being reduced even when a diameter of a mounted lens becomes larger.

According to at least an embodiment of the present invention, there may be provided a lens drive device whose shape is substantially rectangular when viewed in an optical axis direction of a lens, the lens drive device including a movable body which holds the lens and which is movable in the optical axis direction, and a drive mechanism for driving the movable body in the optical axis direction. The drive mechanism includes a drive magnet part which is formed in a substantially triangular prism shape and which is disposed at least one of four corners of the lens drive device, a drive coil which is wound around in a substantially triangular tube shape so that its inner peripheral face is oppositely disposed to an outer peripheral face of the drive magnet part through a gap space, and a magnetic member which is disposed on an object to be photographed or imaged side with respect to the drive coil. The drive magnet part is magnetized so that magnetic flux passing through the drive coil is generated at an opposite position to the drive coil, and the magnetic member is attracted toward an intermediate position of the drive magnet part in the optical axis direction.

In the lens drive device in accordance with an embodiment of the present invention, a drive magnet part which is formed in a substantially triangular prism shape is disposed at least one of four corners of the lens drive device whose shape viewed in the optical axis direction of a lens is substantially quadrangular. Further, a drive coil which is wound around in a substantially triangular tube shape is disposed so that its inner peripheral side faces an outer peripheral face of the drive magnet part through a predetermined gap space. Therefore, the drive magnet part and the drive coil can be disposed at four corners of the lens drive device which are likely to be a dead space.

Further, in the embodiment of the present invention, an inner peripheral face of the drive coil which is wound around in a substantially triangular tube shape is oppositely disposed to an outer peripheral face of the drive magnet part through a predetermined gap space, and the drive magnet part is magnetized so that the magnetic flux passing through the drive coil is generated at an opposite position to the drive coil. Therefore, a magnetic circuit for driving the movable body is efficiently formed by utilizing the entire periphery of the drive magnet part and the entire periphery of the drive coil. Accordingly, even when the sizes of the drive magnet part and the drive coil are reduced, a sufficient drive force for driving the movable body is obtained. In other words, while securing a drive force for driving the movable body, the sizes of the drive magnet part and the drive coil can be reduced.

As described above, in the embodiment of the present invention, the sizes of the drive magnet part and the drive coil are capable of being reduced and the drive magnet part and the drive coil can be disposed at four corners of the lens drive device which are likely to be a dead space. Therefore, in the embodiment of the present invention, even when a diameter of a mounted lens becomes larger, the lens drive device can be made smaller.

Further, in the embodiment of the present invention, the magnetic member which is disposed on the object side with respect to the drive coil is attracted toward the intermediate position of the drive magnet part in the optical axis direction. Therefore, the movable body can be held at a predetermined reference position by utilizing an attraction force generated between the drive magnet part and the magnetic member. Accordingly, even in a state that an electric current is not supplied to the drive coil, rattling of the movable body can be prevented and contact of the movable body with other structural members can be prevented.

In accordance with an embodiment of the present invention, the lens drive device includes a fixed body for movably holding the movable body, and the drive coil and the magnetic member are attached to the movable body and the drive magnet part is attached to the fixed body. In this case, it may be structured that the movable body includes a lens holder which is provided with a small diameter part on which a small diameter lens is mounted and a large diameter part on which a large diameter lens is mounted, and a sleeve which holds the lens holder on its inner peripheral side, and the sleeve is formed with a placing face on which the drive coil is placed at a boundary portion between the small diameter part and the large diameter part of the lens holder, and a placing face for disposing the magnetic member on the end face on the object side of the drive coil. According to this structure, the size of the lens drive device can be reduced and the structure of the lens drive device can be simplified.

In accordance with an embodiment of the present invention, the magnetic member is disposed on an end face on the object to be photographed or imaged side of the drive coil. According to this structure, the magnetic member is disposed by utilizing the end face on the object side of the drive coil and thus another structure for disposing the magnetic member is not required separately. Therefore, the size of the lens drive device can be reduced.

In accordance with an embodiment of the present invention, the drive magnet part includes two drive magnet pieces which are formed in a substantially triangular prism shape and which are disposed so as to superpose on each other in the optical axis direction, and opposite faces in the optical axis direction of the two drive magnet pieces are magnetized in the same magnetic pole as each other, and the magnetic member is attracted toward a portion between the two drive magnet pieces in the optical axis direction. According to this structure, density of a magnetic flux passing through the drive coil is enhanced between the opposite faces between two drive magnet pieces. Accordingly, the magnetic circuit for driving the movable body is further efficiently formed and the sizes of the drive magnet part and the drive coil are further reduced.

In accordance with an embodiment of the present invention, two drive magnet pieces are a first magnet piece which is disposed on the object side and a second magnet piece which is disposed on an opposite-to-object side, a length in the optical axis direction of the first magnet piece is longer than a length of the second magnet piece in the optical axis direction, and the magnetic member is disposed on the object side with respect to an end face on the opposite-to-object side of the first magnet piece in the optical axis direction. The intensity of the magnetic flux generated around the drive magnet part sharply decreases at the beginning but, after that, its decreasing rate becomes gradually smaller as it goes away in the optical axis direction from the opposite faces of the drive magnet pieces. Therefore, according to this structure, the magnetic member can be disposed so as to face the outer peripheral face of the drive magnet part over a region where the intensity of the magnetic flux is gradually decreased. Accordingly, the attraction force generated between the drive magnet part and the magnetic member is prevented from being sharply varied and thus a stable attraction force can be obtained between the drive magnet part, and the magnetic member.

In accordance with an embodiment of the present invention, the drive magnet part is disposed at four corners of the lens drive device, and the magnetic member is formed in a substantially ring shape and is disposed on an inner side in a radial direction of the lens drive device with respect to the drive magnet part. According to this structure, variation in the circumferential direction of the attraction force generated between the drive magnet part and the magnetic member can be prevented. In addition, contact of the drive coil with other structural members can be prevented by utilizing the magnetic member and thus damage of the drive coil and the like are prevented. For example, in a case that the lens drive device includes a flat spring for holding the movable body, contact of the drive coil with the flat spring can be prevented by the magnetic member.

In accordance with an embodiment of the present invention, the lens drive device includes an abutting member for abutting with the movable body which is urged in the optical axis direction by an attraction force generated between the drive magnet part and the magnetic member, and the drive magnet part and the drive coil are disposed so that, when the movable body is located at a reference position where the movable body is abutted with the abutting member, a magnetic center position of the drive magnet part in the optical axis direction is displaced from a center position of the drive coil in the optical axis direction, and so that, when the movable body is located at a predetermined position in a moving range of the movable body, the magnetic center position of the drive magnet part in the optical axis direction and the center position of the drive coil in the optical axis direction are coincided with each other. According to this structure, variation amount of a drive force for the movable body can be reduced over the moving range of the movable body. In this case, it may be structured that, when the movable body is located at the reference position, the center position of the drive coil in the optical axis direction is located on the opposite-to-object side with respect to the magnetic center position of the drive magnet part in the optical axis direction and, when the movable body is located at a position nearest to the object to be photographed or imaged side, the center position of the drive coil is located on the object to be photographed or imaged side with respect to the magnetic center position of the drive magnet part.

When the magnetic center position of the drive magnet part is coincided with the center position of the drive coil, the drive force for the movable body becomes the maximum. Therefore, in the case that the movable body is located at a predetermined reference position, when the magnetic center position of the drive magnet part is coincided with the center position of the drive coil, the drive force for the movable body decreases as a moving amount of the movable body from the reference position becomes larger. As a result, in this case, a variation amount of the drive force for the movable body becomes larger over the moving range of the movable body. On the other hand, when the drive magnet part and the drive coil are disposed so that the magnetic center position of the drive magnet part is coincided with the center position of the drive coil in the optical axis direction at a predetermined position in the moving range of the movable body, the drive force for the movable body which is moved from the reference position increases until the magnetic center position of the drive magnet part and the center position of the drive coil are coincided with each other in the optical axis direction and then decreases. Therefore, in this embodiment, a variation amount of the drive force for the movable body can be reduced over the moving range of the movable body. In this case, it may be structured that a magnetic pole different from magnetic poles of both ends in the optical axis direction of the drive magnet part is formed at an intermediate position in the optical axis direction of the drive magnet part, and the magnetic member is attracted toward the magnetic pole formed at the intermediate position. Further, the drive magnet part is provided with a first magnet piece which is disposed on the object to be photographed or imaged side, a second magnet piece which is disposed on an opposite-to-object side, and a magnetic plate which is sandwiched between the first magnet piece and the second magnet piece, and the first magnet piece, the magnetic plate and the second magnet piece are superposed on each other, and opposite faces in the optical axis direction of the first drive magnet piece and the second magnet piece are magnetized in the same magnetic pole as each other and, when the movable body is located at the reference position, the magnetic member is disposed in the optical axis direction on the object to be photographed or imaged side with respect to an end face on the opposite-to-object side of the first magnet piece and the magnetic member is attracted toward the magnetic plate.

In accordance with an embodiment of the present invention, a width of the drive coil in the optical axis direction is not less than a distance between the opposite faces of the two drive magnet pieces which are faced each other in the optical axis direction. According to this structure, variation of the density of the magnetic flux passing through the drive coil can be restrained over the moving range of the movable body. Therefore, variation of the drive force for the movable body can be prevented over the moving range of the movable body and thus the drive force for the movable body is stabilized.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9(A) is a cross-sectional view showing a state where a movable body is located at a reference position and FIG. 9(B) is a cross-sectional view showing a state where the movable body has been moved to a position nearest to the object to be photographed or imaged side.

DETAILED DESCRIPTION OF THE PREFERRED EMBODIMENTS

An embodiment of the present invention will be described below with reference to the accompanying drawings.

Figure 1:
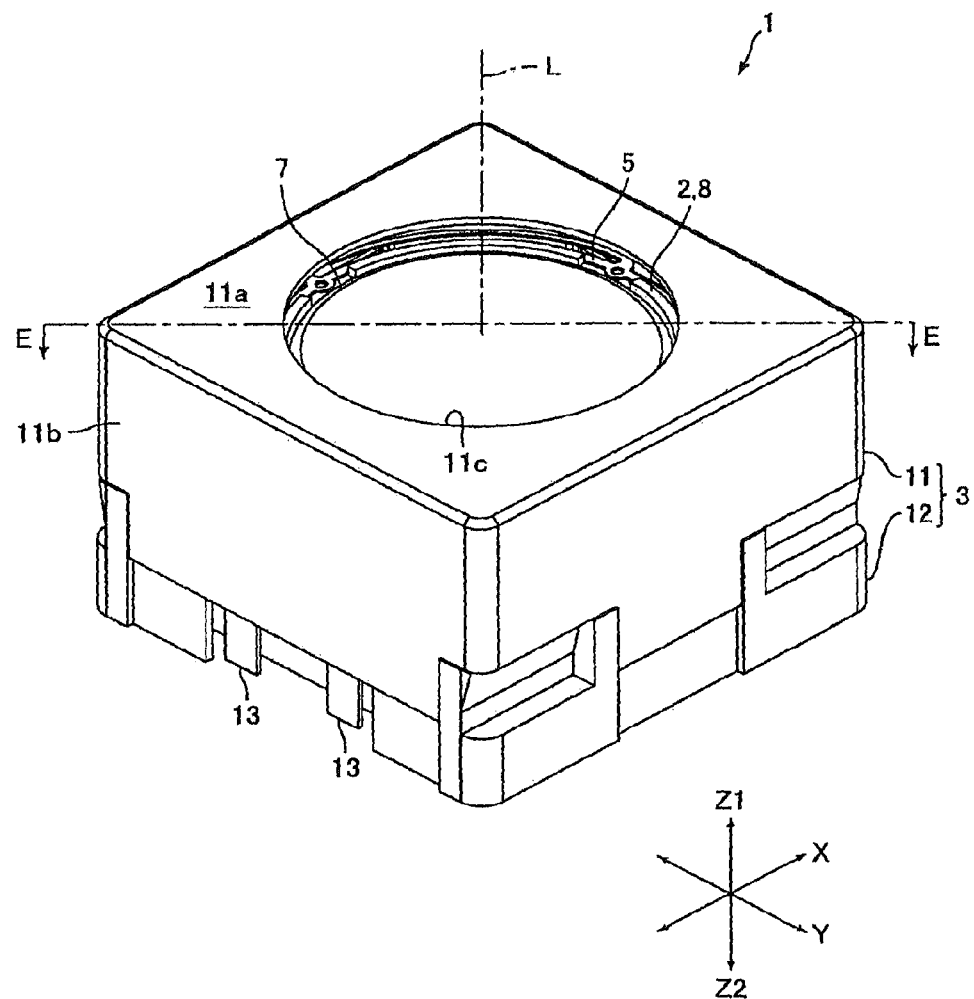
FIG. 1 is a perspective view showing a lens drive device in accordance with an embodiment of the present invention.
Figure 2:
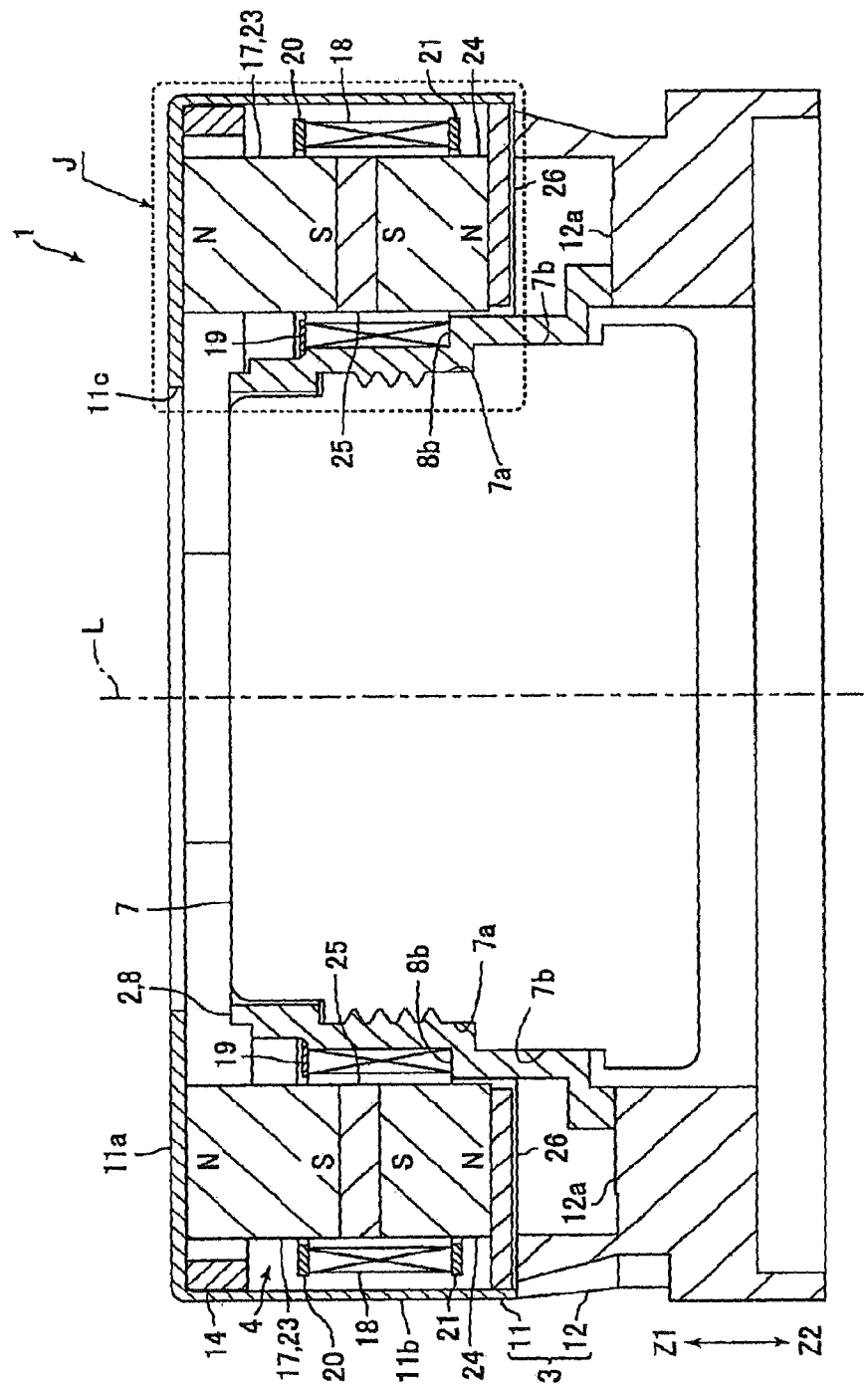
FIG. 2 is a cross-sectional view showing the lens drive device which is cut by the line "E-E" in FIG. 1.
Figure 3:
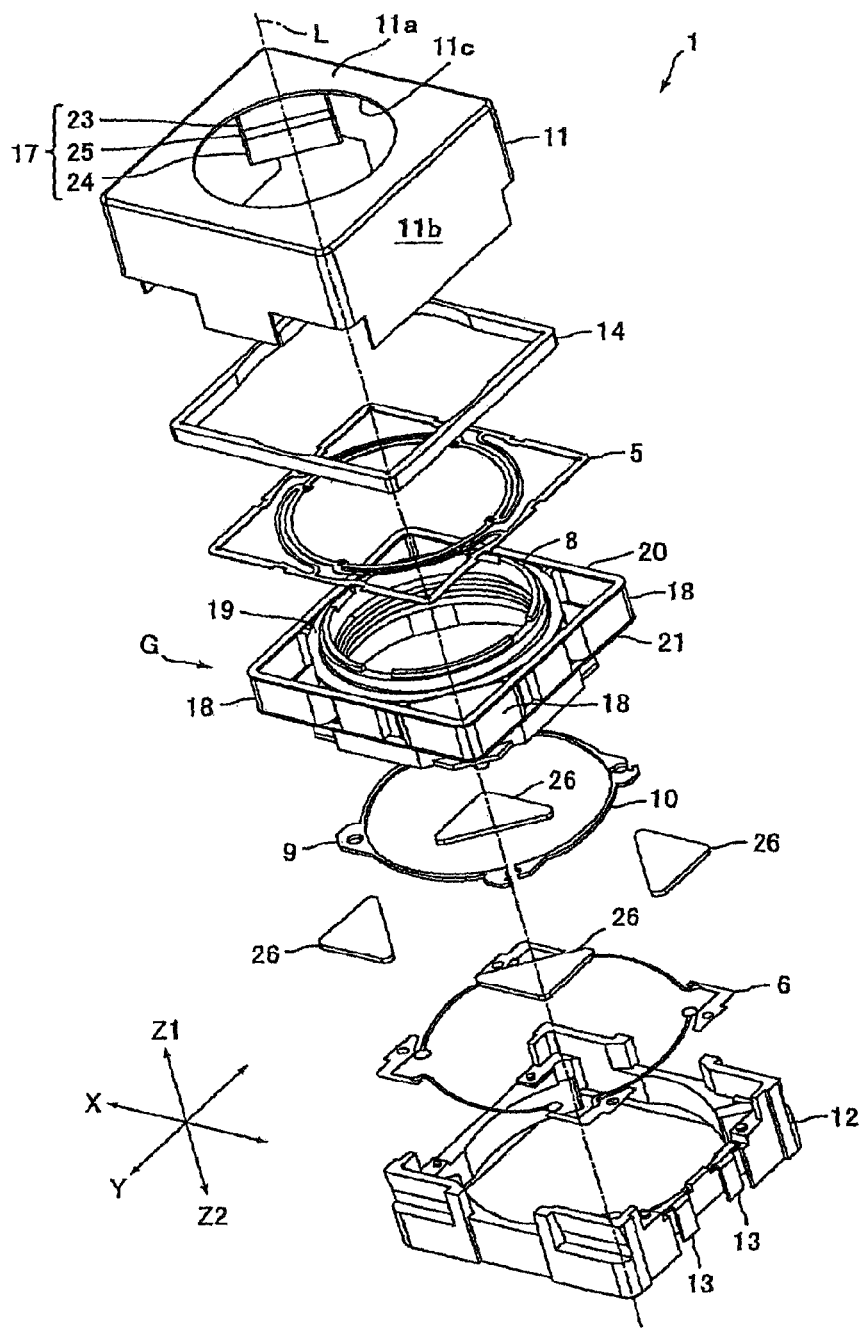
FIG. 3 is an exploded perspective view showing the lens drive device shown in FIG. 1.
Figure 4:
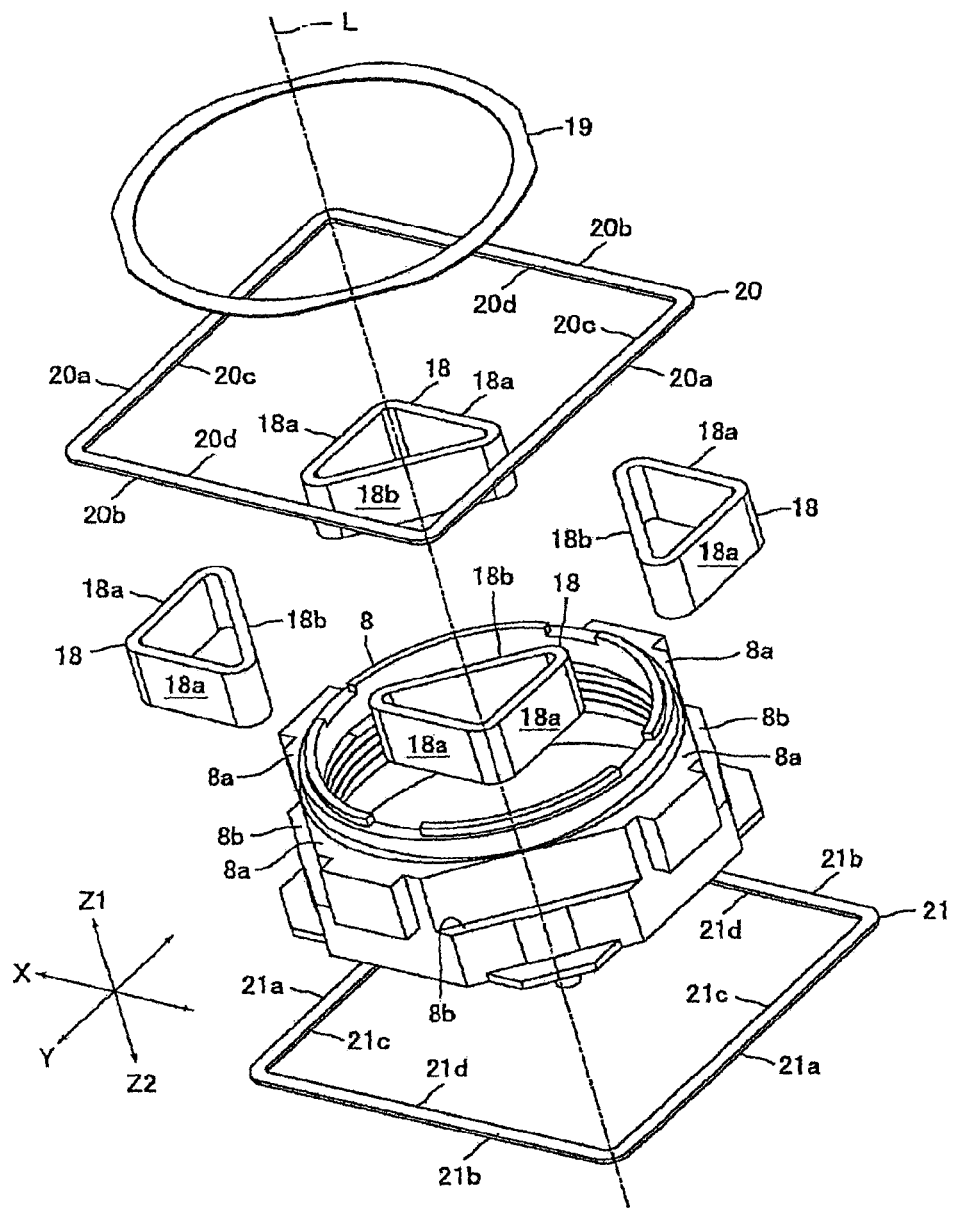
FIG. 4 is an exploded perspective view showing the "G" part in FIG. 3.
Figure 5:
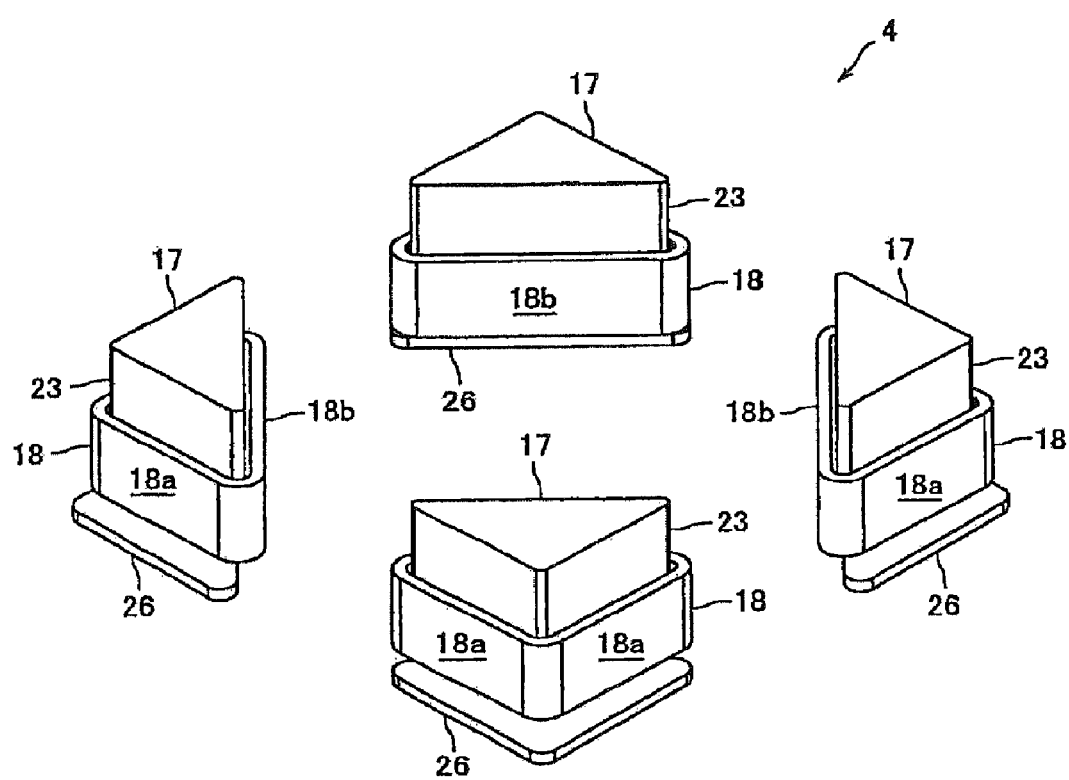
FIG. 5 is a perspective view showing an arranging relationship of drive magnet parts and drive coils shown in FIG. 2.

FIG. 1 is a perspective view showing a lens drive device 1 in accordance with an embodiment of the present invention. FIG. 2 is a cross-sectional view showing the lens drive device 1 which is cut by the line "E-E" in FIG. 1. FIG. 3 is an exploded perspective view showing the lens drive device 1 shown in FIG. 1, FIG. 4 is an exploded perspective view showing the "G" part in FIG. 3. FIG. 5 is a perspective view showing an arranging relationship of drive magnet parts 17 and drive coils 18 shown in FIG. 2.

A lens drive device 1 in this embodiment is mounted on a relatively small camera or imager which is used in a cellular phone or the like. As shown in FIG. 1, an outer shape of the lens drive device 1 is formed in a substantially rectangular prism shape. In other words, the lens drive device 1 is formed so that a shape viewed in a direction of an optical axis "L" of a photographing lens (optical axis direction) is a substantially quadrangle. In this embodiment, the lens drive device 1 is formed so that a shape viewed in the optical axis direction is a substantially square.

In a camera or imager on which the lens drive device 1 in this embodiment is mounted, an imaging element (not shown) is disposed on a lower side ("Z2" direction side) in FIG. 2, and an object to be photographed or imaged located on an upper side in FIG. 2 ("Z1" direction side) is photographed or imaged. Therefore, in the following description, the "Z1" direction side is set to be the object to be photographed or imaged side and the "Z2" direction side is set to be the opposite-to-object side (imaging element side). Further, in the following descriptions, two directions perpendicular to the optical axis "L" and perpendicular to each other are set to be the "X" direction and the "Y" direction. Further, a plane which is formed of the "X" direction and the "Y" direction is referred to as an "X-Y" plane. In this embodiment, four side faces of the lens drive device 1 are parallel to the "X" direction or the "Y" direction.

The lens drive device 1 includes, as shown in FIGS. 1 and 2, a movable body 2 which holds a photographing lens and which is movable in the optical axis direction, a fixed body 3 which holds the movable body 2 movably in the optical axis direction, and a drive mechanism 4 for driving the movable body 2 in the optical axis direction. The movable body 2 is movably held by the fixed body 3 through two kinds of flat springs 5 and 6 (see FIG. 3). The flat springs 5 and 6 are not shown in FIG. 2.

The movable body 2 includes a sleeve 8 which holds a lens holder 7 to which a plurality of lenses are fixed and coil end fixing members 9 and 10 to which end parts of the drive coils 18 structuring the drive mechanism 4 are electrically connected and fixed by using soldering or the like. The coil end fixing members 9 and 10 are not shown in FIG. 2 and the lens holder 7 is not shown in FIG. 3.

The lens holder 7 is formed in a substantially cylindrical shape and a plurality of lenses whose shape viewed in the optical axis direction is a substantially circle is fixed on its inner peripheral side. In this embodiment, a small diameter lens whose diameter is smaller is disposed in a small diameter part 7a on an object side of the lens holder 7 and a large diameter lens whose diameter is larger than the small diameter lens is disposed in a large diameter part 7b on an opposite-to-object side. Therefore, as shown in FIG. 2, an outer diameter of the small diameter part 7a of the lens holder 7 is smaller than an outer diameter of the large diameter part 7b on its opposite-to-object side. Further, a male screw is formed on the outer peripheral face of the small diameter part 7a on the object side of the lens holder 7.

The sleeve 8 is formed in a tube shape and the lens holder 7 is held on its inner peripheral side. In other words, a female screw which engages with the male screw formed on the outer peripheral face of the small diameter part 7a of the lens holder 7 is formed on the inner peripheral face of the sleeve 8. Further, in this embodiment, an outer diameter of the small diameter part 7a of the lens holder 7 is set to be smaller than its outer diameter on the opposite-to-object side and thus an outer diameter on the object side of the sleeve 8 can be set smaller than its outer diameter on the opposite-to-object side.

As shown in FIG. 4, an outer peripheral face of the sleeve 8 corresponding to the small diameter part 7a of the lens holder 7 is formed with a first placing face 8a on which a magnetic member 19 structuring the drive mechanism 4 is placed and a second placing face 8b on which a drive coil 18 structuring the drive mechanism 4 is placed. The first placing face 8a and the second placing face 8b are formed flatly so as to be parallel to the "X-Y" plane and are formed at four positions with a substantially 90° pitch around the optical axis "L". Further, the first placing face 8a and the second placing face 8b are formed so as to be displaced from each other by a substantially 45° around the optical axis "L". The second placing face 8b on which the drive coil 18 is placed is formed at a boundary portion between the small diameter part 7a and the large diameter part 7b of the lens holder 7, and the drive coil 18 is fixed to the outer peripheral face of the sleeve 8 which corresponds to the small diameter part 7a of the lens holder 7. In addition, the first placing face 8a is formed on the object side with respect to the second placing face 8b.

The coil end fixing member 9 and 10 are formed of metal material having electro-conductivity. In this embodiment, the coil end fixing member 9 is formed in a three-quarter circular arc shape and the coil end fixing member 10 is formed in a one-quarter circular arc shape. The coil end fixing members 9 and 10 are fixed to an end face on the opposite-to-object side of the sleeve 8.

The fixed body 3 includes a first case body 11 which is disposed on the object to be photographed or imaged side and a second case body 12 which is disposed on the opposite-to-object side.

The first case body 11 is formed of magnetic material and is formed in a substantially rectangular tube shape which is provided with a bottom part 11a and a tube part 11b. A center of the bottom part 11a disposed on the object to be photographed or imaged side is formed with a circular through hole 11c. The first case body 11 is disposed to surround the outer peripheral side of the movable body 2 and the drive mechanism 4.

The second case body 12 is formed, for example, of resin material and is formed in a substantially rectangular tube shape. The second case body 12 is, as shown in FIG. 2, formed with an abutting face 12a, with which an end face on the opposite-to-object side of the sleeve 8 is abutted, so as to be parallel to the "X-Y" plane. Further, the second case body 12 is, as shown in FIG. 3, fixed with terminals 13. The second case body 12 is attached to the opposite-to-object side of the first case body 11 so as to cover the outer peripheral side on the opposite-to-object side of the lens holder 7.

The flat spring 5 is structured of a sleeve fixed part which is fixed to the sleeve 8, a case body fixed part which is fixed to the first case body 11, and spring parts which connect the sleeve fixed part with the case body fixed part. The flat spring 5 is disposed on the object side of the movable body 2. The sleeve fixed part is fixed to an end face on the object side of the sleeve 8. The case body fixed part is fixed to an opposite-to-object side face of the bottom part 11a of the first case body 11 through a spacer 14 formed in a substantially rectangular frame shape. In other words, the case body fixed part is fixed to the spacer 14 which is fixed to an opposite-to-object side face of the bottom part 11a.

The flat spring 6 is structured of a sleeve fixed part which is fixed to the sleeve 8, a case body fixed part which is fixed to the second case body 12, and spring parts which connect the sleeve fixed part with the case body fixed part. The flat spring 6 is disposed on the opposite-to-object side of the movable body 2. The sleeve fixed part is fixed to an end face on the opposite-to-object side of the sleeve 8 through the coil end fixing members 9 and 10. In other words, the sleeve fixed part is fixed to the coil end fixing members 9 and 10. The case body fixed part is fixed to a fixing face which is formed on the object side of the second case body 12.

The drive mechanism 4 includes, as shown in FIGS. 2 through 5, four drive magnet parts 17 which are formed in a substantially triangular prism shape and are disposed at four corners of the lens drive device 1, specifically, at four corners on the inner side of the first case body 11, four drive coils 18 which are wound around in a substantially triangular tube shape and whose inner peripheral faces are oppositely disposed to outer peripheral faces of the drive magnet parts 17 through predetermined gap spaces, and a magnetic member 19 which is disposed on the object side with respect to the drive coils 18, and coil protection members 20 and 21 which are attached to the object sides and the opposite-to-object sides of the drive coils 18. A detailed structure of the drive mechanism 4 will be described below.

Figure 6:
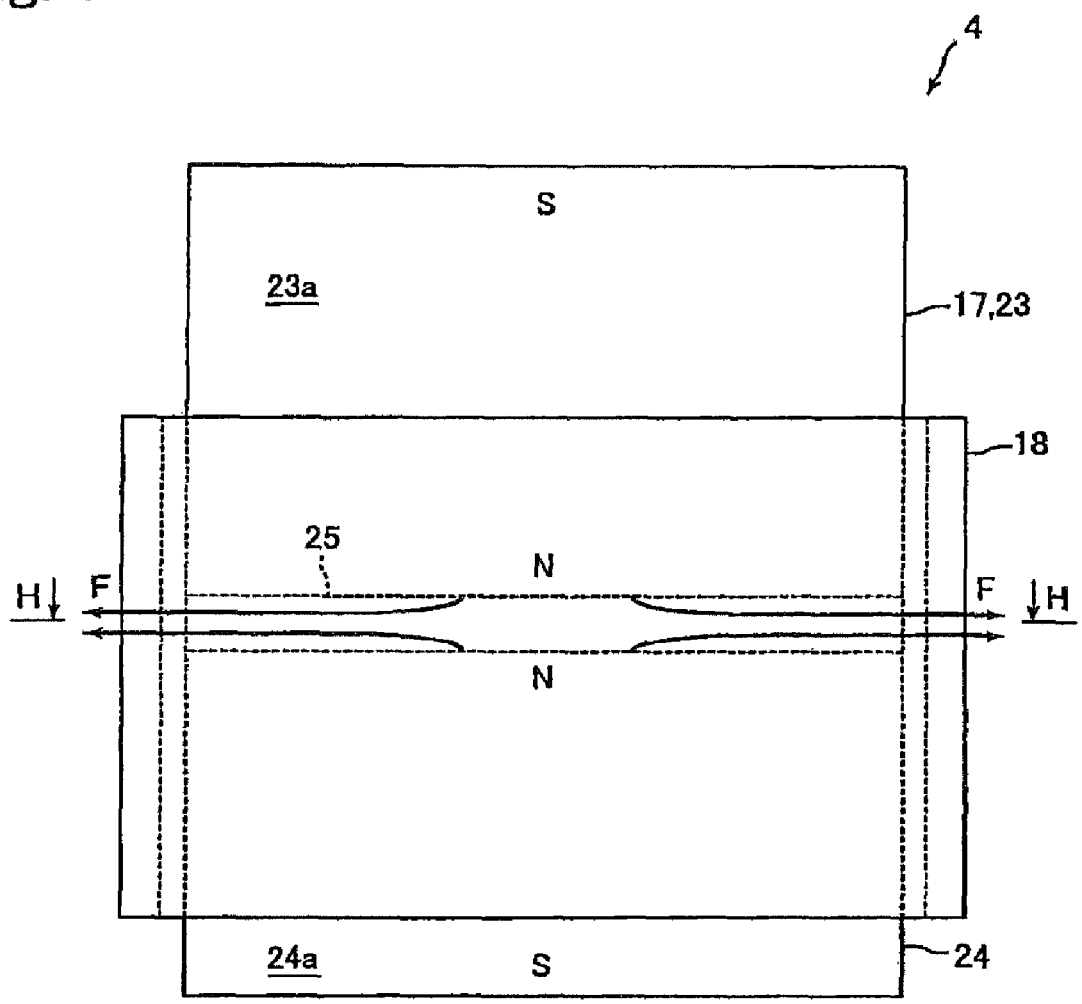
FIG. 6 is a side view showing the drive magnet part and the drive coil shown in FIG. 5.
Figure 7:
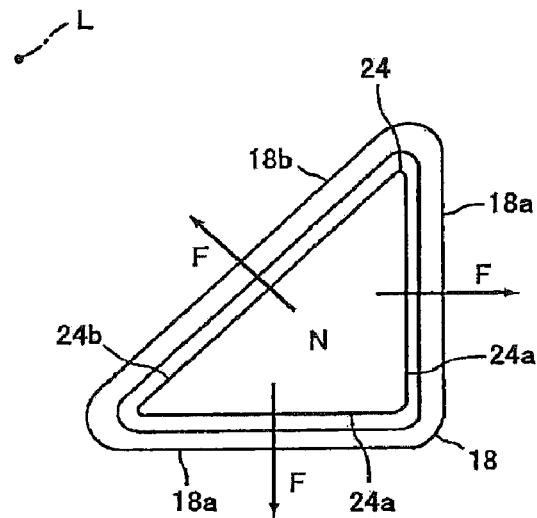
FIG. 7 is a plan view showing a drive magnet piece and the drive coil which is viewed in the "H-H" direction in FIG. 6.
Figure 8:
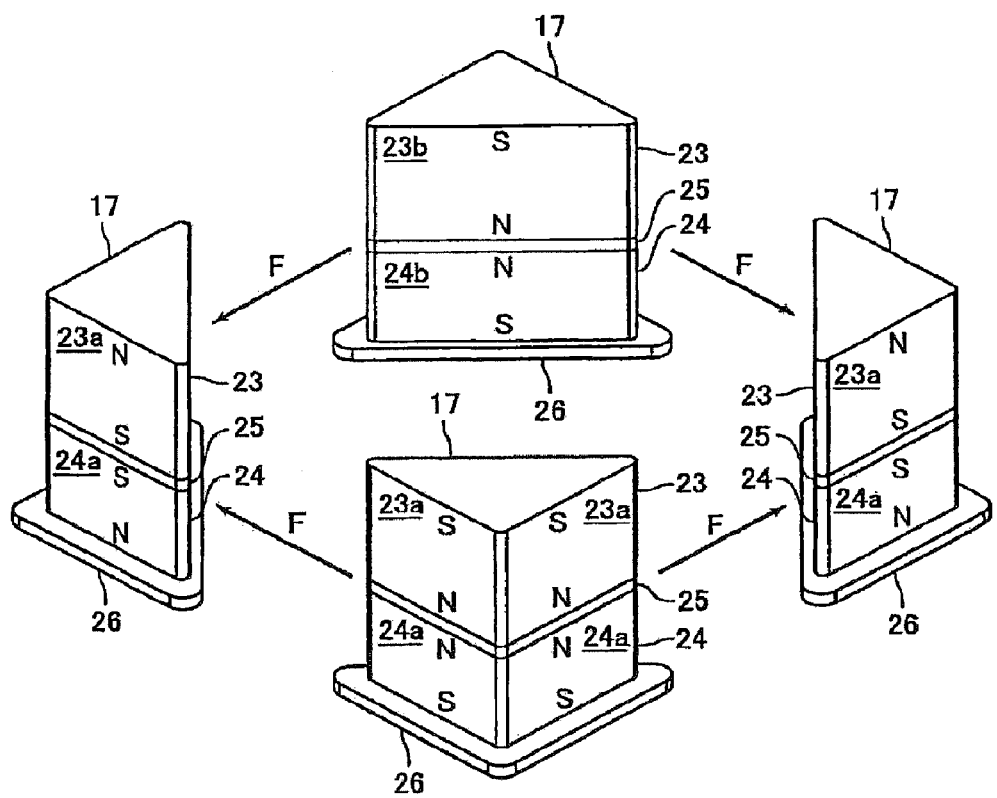
FIG. 8 is an explanatory perspective view showing magnetized states of the drive magnet parts which are disposed at four corners of the lens drive device shown in FIG. 1.
Figure 9A:
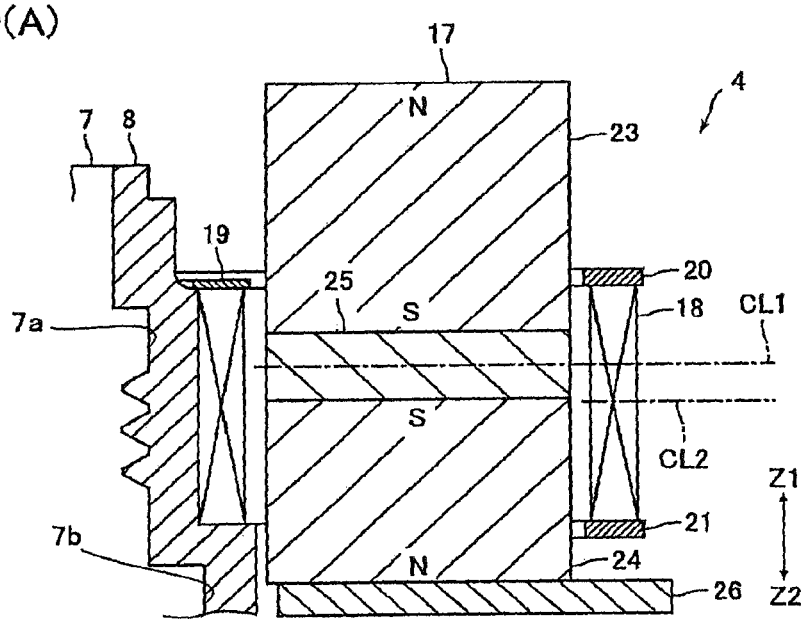
FIGS. 9(A) and 9(B) are enlarged views showing the "J" part in FIG. 2.
Figure 9B:
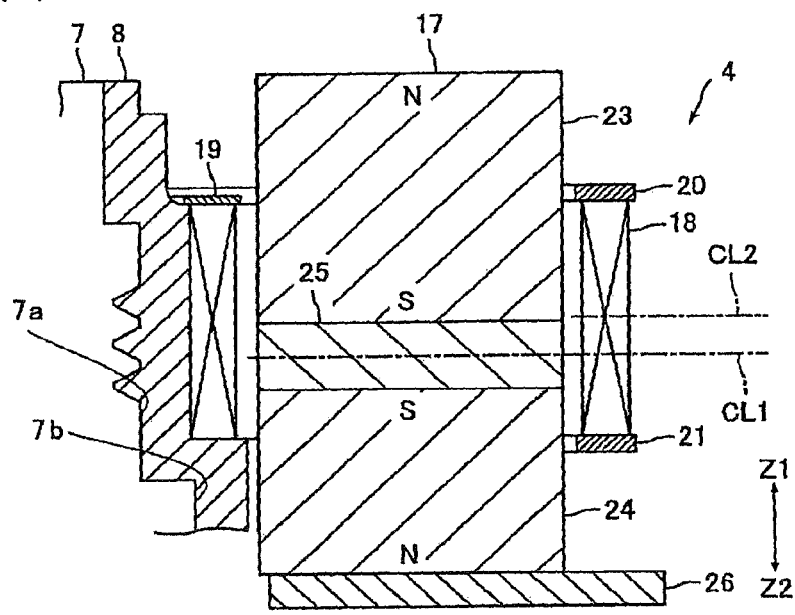
Figure 10:
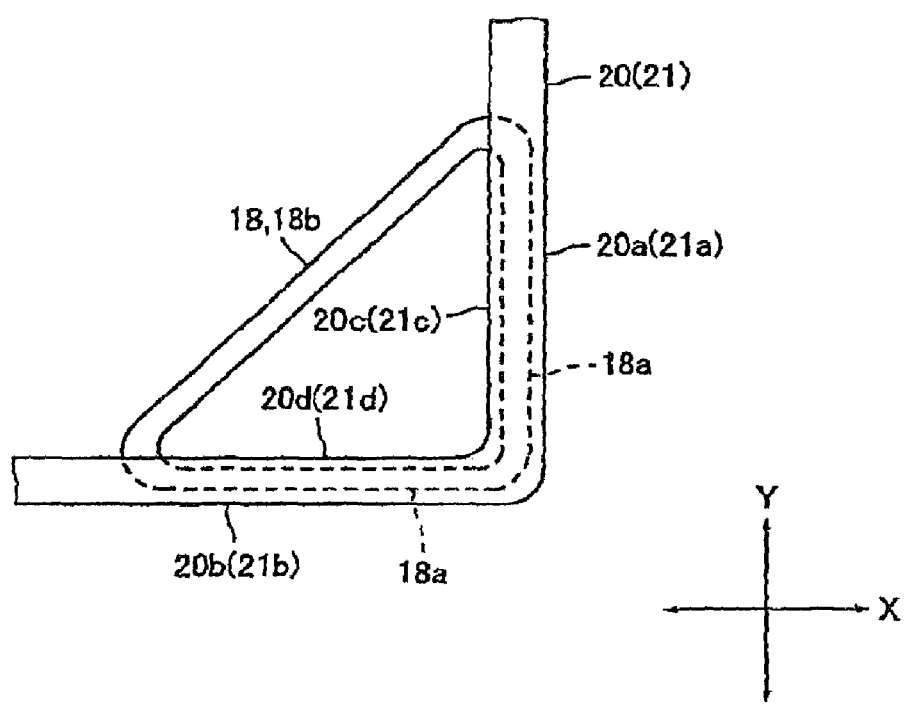
FIG. 10 is an explanatory plan view showing an arranging relationship between the drive coil and a coil protection member shown in FIG. 4.

FIG. 6 is a side view showing the drive magnet part 17 and the drive coil 18 shown in FIG. 5. FIG. 7 is a plan view showing a drive magnet piece 24 and the drive coil 18 which is viewed in the "H-H" direction in FIG. 6, FIG. 8 is an explanatory perspective view showing magnetized states of the drive magnet parts 17 which are disposed at four corners of the lens drive device 1 shown in FIG. 1. FIGS. 9(A) and 9(B) are enlarged views showing the "J" part in FIG. 2. FIG. 9(A) is a cross-sectional view showing a state where the movable body 2 is located at a reference position and FIG. 9(B) is a cross-sectional view showing a state where the movable body 2 has been moved to a position nearest to the object to be photographed or imaged side. FIG. 10 is an explanatory plan view showing an arranging relationship between the drive coil 18 and the coil protection members 20 and 21 shown in FIG. 4.

The drive magnet part 17 includes two substantially triangular prism-shaped drive magnet pieces 23 and 24 and a magnetic plate 25 which is disposed between the drive magnet pieces 23 and 24, that are disposed to superpose on each other in the optical axis direction. In this embodiment, the drive magnet piece 23 is disposed on the object side and the drive magnet piece 24 is disposed on the opposite-to-object side. An end face on the opposite-to-object side of the drive magnet piece 23 is fixed to an object side face of the magnetic plate 25 and an end face on the object side of the drive magnet piece 24 is fixed to an opposite-to-object side face of the magnetic plate 25.

The drive magnet pieces 23 and 24 are formed so that their shapes viewed in the optical axis direction are a substantially rectangular equilateral triangle. As shown in FIGS. 7 and 8, the drive magnet pieces 23 and 24 are provided with two rectangular flat face parts 23a and 24a, which are substantially parallel to the optical axis "L" and perpendicular to each other, and rectangular slant face parts 23b and 24b which are substantially parallel to the optical axis "L" for connecting two flat parts 23a and 24a. In this embodiment, as shown in FIG. 6 and FIGS. 9(A) and 9(B), a length in the optical axis direction of the drive magnet piece 23 is set to be longer than a length in the optical axis direction of the drive magnet piece 24.

The drive magnet pieces 23 and 24 are disposed so that an inner peripheral face of the tube part 11b of the first case body 11 is substantially parallel to the flat face parts 23a and 24a. In other words, two drive magnet pieces 23 and two drive magnet pieces 24 which are disposed at diagonal positions on the inner side of the first case body 11 are respectively disposed so that the slant face parts 23b and the slant face parts 24b are faced each other. Further, the drive magnet pieces 23 are fixed to the bottom part 11a of the first case body 11. Specifically, end faces on the object side of the drive magnet pieces 23 are fixed to the opposite-to-object side face of the bottom part 11a. The end faces on the object side of the drive magnet pieces 23 are abutted with the opposite-to-object side face of the bottom part 11a.

The magnetic plate 25 is formed of magnetic material. The magnetic plate 25 is formed in a flat plate shape so that its shape viewed in the optical axis direction is substantially rectangular equilateral triangle similarly to the drive magnet pieces 23 and 24. Therefore, the drive magnet part 17 which is regarded as one piece of triangular prism is structured of two drive magnet pieces 23 and 24 and the magnetic plate 25.

An end face on the opposite-to-object side of the drive magnet piece 24 is fixed to a flat plate-shaped magnetic plate 26 which is formed of magnetic material. The magnetic plate 26 is formed so that its shape viewed in the optical axis direction is a substantially rectangular equilateral triangle. As shown in FIG. 8, the magnetic plate 26 is fixed to the drive magnet piece 24 so that its slant side part becomes substantially parallel to the slant face part 24b of the drive magnet piece 24. Further, the magnetic plate 26 is abutted with the inner peripheral face of the tube part 11b of the first case body 11.

The drive coil 18 is, as shown in FIG. 7, wound around so that its shape viewed in the optical axis direction is a substantially rectangular equilateral triangle. As shown in FIGS. 5 and 7, the drive coil 18 is provided with two perpendicular face parts 18a, which are formed in a rectangular shape, substantially parallel to the optical axis "L" and perpendicular to each other, and a rectangular slant face part 18b which is substantially parallel to the optical axis "L" and connects two perpendicular face parts 18a. In accordance with an embodiment of the present invention, four drive coils 18 are formed by means of that one conducting wire is wound around successively. One end part of the conducting wire is wound around and connected with the coil end fixing member 9 and the other end part of the conducting wire is wound around and connected with the coil end fixing member 10.

Four drive coils 18 are fixed to the outer peripheral face of the sleeve 8 in a state that the slant face parts 18b are placed on the second placing faces 8b of the sleeve 8. Specifically, four drive coils 18 are fixed to the outer peripheral face of the sleeve 8 with a substantially 90° pitch so that the inner peripheral face of the drive coil 18 and the outer peripheral face of the drive magnet part 17 are substantially parallel to each other through a predetermined gap space. The drive coils 18 are disposed at four corners on the inner side of the first case body 11. In this embodiment, the drive coils 18 are disposed at four corners on the inner side of the first case body 11 in a state that a predetermined gap space is maintained between the inner peripheral face of the first case body 11 and the drive coils 18. Therefore, the drive coils 18 are movable in the optical axis direction together with the sleeve 8.

A width in the optical axis direction of the drive coil 18 is set to be not less than a distance between opposite faces of the drive magnet pieces 23 and 24 faced each other in the optical axis direction, in other words, not less than a thickness of the magnetic plate 25. More specifically, the width in the optical axis direction of the drive coil 18 is set to be not less than the sum of the thickness of the magnetic plate 25 and a moving distance of the movable body 2. Further, in this embodiment, the drive magnet part 17 and the drive coil 18 are disposed so that the magnetic plate 25 is always disposed on the inner peripheral side of the drive coil 18 over the moving range of the movable body 2. In other words, in this embodiment, the drive magnet part 17 and the drive coil 18 are disposed so that the opposite-to-object side end of the drive coil 18 is not further moved on the object side than the object side end of the drive magnet piece 24, and the object side end of the drive coil 18 is not further moved on the opposite-to-object side than the opposite-to-object side end of the drive magnet piece 23.

As shown in FIGS. 6 and 8, two drive magnet pieces 23 and 24 structuring the drive magnet part 17 are disposed so that the same magnetic poles ("S"-pole and "S"-pole, or "N"-pole and "N"-pole) are faced each other in the optical axis direction. In other words, opposite faces of the drive magnet pieces 23 and 24 are magnetized in the same magnetic pole respectively. Therefore, as shown in FIGS. 6 and 7, magnetic flux "F" passing through the perpendicular face parts 18a and the slant face part 18b of the drive coil 18 is generated between the drive magnet pieces 23 and 24. In other words, the drive magnet part 17 is magnetized so that the magnetic flux "F" passing through the drive coil 18 is generated at a position where the drive magnet part 17 faces the drive coil 18. Further, the center in the optical axis direction of the magnetic plate 25 is located at a magnetic center position of the drive magnet part 17 in the optical axis direction. In this embodiment, a position of the magnetic center position "CL1" can be changed arbitrarily by changing a thickness of the magnetic plate 25.

As shown in FIG. 8, the magnetic poles which are formed on opposite faces of two drive magnet pieces 23 and 24 structuring the drive magnet part 17 are different from the magnetic poles which are formed on opposite faces of two other drive magnet pieces 23 and 24 adjacent to each other in the circumferential direction of the lens drive device 1. For example, magnetic poles formed on the opposite faces of the drive magnet pieces 23 and 24 which are disposed on the right side and the left side in FIG. 8 are "S"-poles, and magnetic poles formed on the opposite faces of the drive magnet pieces 23 and 24 which are disposed on the upper side and the lower side in FIG. 6 are "N"-poles. Therefore, in the example shown in FIG. 8, the magnetic flux "F" is generated so as to go from spaces between the drive magnet pieces 23 and 24 disposed on the upper side and the lower side in FIG. 8 to spaces between the drive magnet pieces 23 and 24 disposed on the right side and the left side in FIG. 8.

In this embodiment, the magnetic poles which are formed on opposite faces of two drive magnet pieces 23 and 24 are different from the magnetic poles which are formed on opposite faces of other two drive magnet pieces 23 and 24 adjacent to each other in the circumferential direction. Therefore, winding directions of the drive coils 18 which are disposed around the drive magnet pieces 23 and 24 disposed on the upper side and the lower side in FIG. 8 are different from winding directions of the drive coils 18 which are disposed around the drive magnet pieces 23 and 24 disposed on the right side and the left side in FIG. 8.

The magnetic member 19 which is formed of magnetic material is, as shown in FIG. 4, formed in a substantially ring shape. The magnetic member 19 in this embodiment is formed in a flat plate shape. The magnetic member 19 is disposed on the end face on the object side of the drive coil 18. Specifically, the magnetic member 19 is fixed to the end face on the object side of the slant face part 18b so as to cover the substantially entire region of the end face on the object side of the slant face part 18b. The magnetic member 19 is disposed on the inner side with respect to the drive magnet part 17 in the radial direction of the lens drive device 1. Further, in this embodiment, a distance between the first placing face 8a and the second placing face 8b in the optical axis direction is set to be substantially equal to the width of the drive coil 18 in the optical axis direction. Therefore, the magnetic member 19 is fixed to the end face on the object side of the drive coil 18 in the state where the magnetic member 19 is placed on the first placing face 8a.

As described above, in this embodiment, the drive magnet part 17 and the drive coil 18 are disposed so that the magnetic plate 25 is always disposed on the inner peripheral side of the drive coil 18 in the moving range of the movable body 2. Therefore, the magnetic member 19 is disposed nearer to the object side than the end face on opposite-to-object side of the drive magnet piece 23 over the moving range of the movable body 2. In other words, the magnetic member 19 is disposed so that the outer side end in the radial direction of the magnetic member 19 faces the slant face part 23b of the drive magnet piece 23.

Further, in this embodiment, the drive magnet part 17 and the drive coil 18 are disposed so that the magnetic member 19 is disposed on the opposite-to-object side with respect to the center position in the optical axis direction of the drive magnet piece 23 over the moving range of the movable body 2. In other words, the drive magnet part 17 and the drive coil 18 are disposed so that the magnetic member 19 is attracted toward an intermediate position in the optical axis direction of the drive magnet part 17 over the moving range of the movable body 2. Specifically, the drive magnet part 17 and the drive coil 18 are disposed so that the magnetic member 19 is attracted toward the magnetic center position "CL1" of the drive magnet part 17. In other words, the drive magnet part 17 and the drive coil 18 are disposed so that the magnetic member 19 is attracted toward a portion between the drive magnet pieces 23 and 24 in the optical axis direction.

As described above, the magnetic member 19 is attracted toward the magnetic center position "CL1" of the drive magnet part 17. Therefore, when an electric current is not supplied to the drive coil 18, as shown in FIG. 2, the end face on the opposite-to-object side of the sleeve 8 is abutted with an abutting face 12a of the second case body 12 by an attraction force generated between the magnetic member 19 and the drive magnet part 17. The second case body 12 in this embodiment is an abutting member with which the movable body 2 is abutted which is urged in the optical axis direction by the attraction force generated between the magnetic member 19 and the drive magnet part 17.

In this embodiment, the flat spring 5 is fixed to the movable body 2 and the fixed body 3 so that an urging force toward the opposite-to-object side is generated in the movable body 2 when an electric current is not supplied to the drive coils 18. Further, the flat spring 6 is fixed to the movable body 2 and the fixed body 3 so that an urging force in the optical axis direction by the flat spring 6 is not generated in the movable body 2 when the end face on the opposite-to-object side of the sleeve 8 is abutted with the abutting face 12a of the second case body 12.

When the movable body 2 is located at a predetermined reference position (initial position) where the end face on the opposite-to-object side of the sleeve 8 is abutted with the abutting face 12a of the second case body 12, as shown in FIG. 9(A), the center position "CL2" in the optical axis direction of the drive coil 18 is further disposed on the opposite-to-object side than the magnetic center position "CL1" of the drive magnet part 17. In other words, when the movable body 2 is located at the reference position, the magnetic center position "CL1" of the drive magnet part 17 and the center position "CL2" of the drive coil 18 are displaced from each other.

Further, when an electric current is supplied to the drive coil 18 and the movable body 2 has been moved to a position nearest to the object side, as shown in FIG. 9(B), the center position "CL2" of the drive coil 18 is disposed nearer to the object side than the magnetic center position "CL1" of the drive magnet part 17. In other words, when the movable body 2 is located at a predetermined position in the moving range, the magnetic center position "CL1" of the drive magnet part 17 and the center position "CL2" of the drive coil 18 are coincided with each other. Specifically, in this embodiment, when the movable body 2 located at the reference position has been moved to the object side by a half distance of the moving range of the movable body 2, in other words, at a roughly center position of the moving range of the movable body 2, the magnetic center position "CL1" of the drive magnet part 17 and the center position "CL2" of the drive coil 18 are coincided with each other.

The coil protection members 20 and 21 are formed of relatively hard resin material such as PET (polyethylene terephthalate) or metal material and, as shown in FIG. 4, are formed in a substantially rectangular frame shape. Further, the coil protection members 20 and 21 are formed in a flat plate shape. In this embodiment, the coil protection member 20 is attached to the end face on the object side of the drive coil 18 and the coil protection member 21 is attached to the end face on the opposite-to-object side of the drive coil 18. Specifically, the coil protection member 20 is fixed to the end faces on the object side of the perpendicular face parts 18a of four drive coils 18, and the coil protection member 21 is fixed to the end faces on the opposite-to-object side of the perpendicular face parts 18a of four drive coils 18.

As shown in FIG. 10, outer side end parts 20a and 21a in the "X" direction of the coil protection members 20 and 21 are protruded toward the outer side in the "X" direction from the outer peripheral face of the perpendicular face part 18a which is perpendicular to the "X" direction. Further, outer side end parts 20b and 21b in the "Y" direction of the coil protection members 20 and 21 are protruded toward the outer side in the "Y" direction from the outer peripheral face of the perpendicular face part 18a which is perpendicular to the "Y" direction. Further, in this embodiment, inner side end parts 20c and 21c in the "X" direction of the coil protection members 20 and 21 are protruded toward the inner side in the "X" direction from the inner peripheral face of the perpendicular face part 18a which is perpendicular to the "X" direction. Further, inner side end parts 20d and 21d in the "Y" direction of the coil protection members 20 and 21 are protruded toward the inner side in the "Y" direction from the inner peripheral face of the perpendicular face part 18a which is perpendicular to the "Y" direction.

Therefore, for example, due to an impact which is applied to the lens drive device 1, when the movable body 2 is relatively displaced in the "X" direction or the "Y" direction with respect to the fixed body 3, when the movable body 2 is relatively turned around the axial direction with respect to the fixed body 3, when the optical axis of the movable body 2 is inclined, or the like, the coil protection members 20 and 21 are abutted with the inner peripheral face of the tube part 11b of the first case body 11 or with the drive magnet part 17 to protect the drive coil 18.

As described above, in this embodiment, the substantially triangular prism-shaped drive magnet parts 17 and the substantially triangular tube-shaped drive coils 18 are disposed at four corners of the lens drive device 1 whose shape viewed in the optical axis direction is substantially square shape. Therefore, the drive magnet parts 17 and the drive coils 18 are disposed at four corners of the lens drive device 1 which are likely to be dead spaces of the lens drive device 1 for driving a lens whose shape viewed in the optical axis direction is substantially circular.

Further, in this embodiment, the inner peripheral face of the drive coil 18 which is wound around in a substantially triangular tube shape is oppositely disposed to the outer peripheral face of the drive magnet part 17 through a predetermined gap space, and the drive magnet part 17 is magnetized so that magnetic flux "F" passing through the drive coil 18 is generated at a position facing the drive coil 18. Therefore, a magnetic circuit for driving the movable body 2 is efficiently formed by utilizing the entire periphery of the drive magnet part 17 and the entire periphery of the drive coil 18. Accordingly, even when the sizes of the drive magnet part 17 and the drive coil 18 are reduced, a required drive force for driving the movable body 2 can be obtained. In other words, while securing a drive force for driving the movable body 2, the sizes of the drive magnet part 17 and the drive coil 18 can be reduced.

As described above, in this embodiment, the sizes of the drive magnet part 17 and the drive coil 18 can be reduced, and the drive magnet parts 17 and the drive coils 18 are disposed at four corners, which are likely to be dead spaces, of the lens drive device 1. Therefore, in this embodiment, even when a diameter of a mounted lens is increased, the size of the lens drive device 1 can be reduced.

In this embodiment, the magnetic member 19 is disposed on the end face on the object side of the drive coil 18 and the magnetic member 19 is attracted toward the intermediate position in the optical axis direction of the drive magnet part 17. Therefore, the movable body 2 is held at the reference position where the end face on the opposite-to-object side of the sleeve 8 is abutted with the abutting face 12a of the second case body 12 by utilizing the attraction force generated between the drive magnet part 17 and the magnetic member 19. Accordingly, even in the state where an electric current is not supplied to the drive coil 18, rattling of the movable body 2 is prevented and thus contact of the movable body 2 with other structural members can be prevented.

In this embodiment, the magnetic member 19 is disposed on the end face on the object side of the drive coil 18. Therefore, another structure for disposing the magnetic member 19 is not required separately and thus the structure of the lens drive device 1 can be simplified. Further, in this embodiment, the magnetic member 19 is disposed on the object side of the sleeve 8 whose outer diameter is smaller and thus the size in the radial direction of the lens drive device 1 can be reduced.

In this embodiment, the opposite faces of two drive magnet pieces 23 and 24 which are disposed so as to superpose on each other in the optical axis direction are magnetized in the same magnetic pole. Therefore, density of the magnetic flux "F" passing through the drive coil 18 are enhanced between the opposite faces between two drive magnet pieces 23 and 24. Accordingly, the magnetic circuit for driving the movable body 2 is further efficiently formed and the sizes of the drive magnet part 17 and the drive coil 18 are further reduced.

In this embodiment, the length in the optical axis direction of the drive magnet piece 23 is set to be longer than the length in the optical axis direction of the drive magnet piece 24. Further, in the moving range of the movable body 2, the magnetic member 19 is disposed nearer to the object side than the end face on the opposite-to-object side of the drive magnet piece 23, and the outer side end in the radial direction of the magnetic member 19 faces the slant face part 23b of the drive magnet piece 23. The intensity of the magnetic flux "F" generated around the drive magnet part 17 sharply decreases at the beginning but, after that, its decreasing rate becomes gradually smaller as it goes away in the optical axis direction from the opposite faces of the drive magnet pieces 23 and 24. In this embodiment, the outer side end in the radial direction of the magnetic member 19 faces the slant face part 23b of the drive magnet piece 23 whose length in the optical axis direction is longer and thus the magnetic member 19 can be disposed so as to face the outer peripheral face of the drive magnet part 17 where the intensity of the magnetic flux "F" is gradually decreased. Therefore, even when the movable body 2 is moved in the optical axis direction, the attraction force generated between the drive magnet part 17 and the magnetic member 19 is prevented from being sharply varied and thus a stable attraction force can be obtained between the drive magnet part 17 and the magnetic member 19.

In this embodiment, the magnetic member 19 is formed in a substantially ring shape and is fixed to the end face on the object side of the slant face part 18b. Therefore, contact of the drive coil 18 with other structural members can be prevented by the magnetic member 19 and thus damage of the drive coil 18 and the like are prevented. For example, contact of the drive coil 18 with the flat spring 5 can be prevented by the magnetic member 19. Especially, in this embodiment, the magnetic member 19 is fixed to the end face on the object side of the slant face part 18b so as to cover the roughly entire region of the end face on the object side of the slant face part 18b. Therefore, damage of the slant face part 18b can be surely prevented by the magnetic member 19.

In this embodiment, the magnetic member 19 is formed in a substantially ring shape. Therefore, variation in the circumferential direction of the attraction force generated between the drive magnet part 17 and the magnetic member 19 are prevented and a roughly uniform attraction force is generated over the entire periphery of the magnetic member 19.

In this embodiment, when the movable body 2 is located at the reference position, the magnetic center position "CL1" of the drive magnet part 17 and the center position "CL2" of the drive coil 18 are displaced from each other and, when the movable body 2 is located at a predetermined position in the moving range, the magnetic center position "CL1" of the drive magnet part 17 is coincided with the center position "CL2" of the drive coil 18. Therefore, a variation amount of the drive force for the movable body 2 can be reduced over the moving range of the movable body 2.

When the magnetic center position "CL1" of the drive magnet part 17 is coincided with the center position "CL2" of the drive coil 18, the drive force of the movable body 2 becomes the maximum. Therefore, in the case that the movable body 2 is located at the reference position, when the magnetic center position "CL1" of the drive magnet part 17 is coincided with the center position "CL2" of the drive coil 18, the drive force for the movable body 2 decreases as a moving amount of the movable body 2 from the reference position becomes larger. As a result, in this case, a variation amount of the drive force for the movable body 2 becomes larger over the moving range of the movable body 2. On the other hand, according to this embodiment, the drive force for the movable body 2 which is moved from the reference position increases until the magnetic center position "CL1" of the drive magnet part 17 and the center position "CL2" of the drive coil 18 are coincided with each other in the optical axis direction and then decreases. Therefore, in this embodiment, a variation amount of the drive force for the movable body 2 can be reduced over the moving range of the movable body 2.

Especially in this embodiment, the movable body 2 is movably held in the fixed body 3 by the flat springs 5 and 6. Therefore, as the moving amount of the movable body 2 from the reference position becomes larger, the urging forces of the flat springs 5 and 6 become larger and thus a thrust force for the movable body 2 (sum of a drive force of the drive mechanism 4 and urging forces of the flat springs 5 and 6) is easily decreased and a variation amount of the thrust force for the movable body 2 becomes larger over the moving range of the movable body 2. However, in this embodiment, a variation amount of the thrust force for the movable body 2 can be reduced over the moving range of the movable body 2.

In this embodiment, the width of the drive coil 18 in the optical axis direction is set to be not less than the sum of the distance between the opposite faces of the drive magnet pieces 23 and 24 to each other in the optical axis direction and the moving distance of the movable body 2. Therefore, variation of the density of the magnetic flux "F" passing through the drive coil 18 can be restrained over the moving range of the movable body 2. Therefore, variation of the drive force for the movable body 2 can be restrained over the moving range of the movable body 2 and thus the drive force for the movable body 2 can be stabilized.

Although the present invention has been shown and described with reference to a specific embodiment, various changes and modifications will be apparent to those skilled in the art from the teachings herein.

In the embodiment described above, the magnetic plate 25 is disposed between the drive magnet pieces 23 and 24. However, a gap space may be formed between the opposite faces of the drive magnet pieces 23 and 24, or the opposite faces of the drive magnet pieces 23 and 24 may be abutted with each other. Further, in the embodiment described above, the drive magnet part 17 is structured of two drive magnet pieces 23 and 24 and the magnetic plate 25. However, the drive magnet part 17 may be structured of one drive magnet piece. In this case, the drive magnet piece is magnetized so that magnetic poles formed at both ends in the optical axis direction are different from a magnetic pole formed at an intermediate position in the optical axis direction. In other words, the drive magnet piece is magnetized so that the magnetic flux "F" passing through the drive coil 18 is generated at a position facing the drive coil 18. Further, in this case, the magnetic member 19 is attracted toward the intermediate position of the drive magnet piece.

In the embodiment described above, the magnetic member 19 is formed in a substantially ring shape but the magnetic member 19 is not required to be formed in a substantially ring shape. For example, the magnetic member 19 may be formed in a substantially circular arc shape. In this case, a plurality of magnetic members 19 may be fixed to the object side faces of the drive coils 18. Further, when a plurality of magnetic members 19 are fixed to the object side faces of the drive coils 18, in order to prevent variation in the circumferential direction of attraction forces generated between the drive magnet parts 17 and the magnetic members 19, it is preferable that a plurality of the magnetic members 19 are disposed with an equal angular pitch. In this case, when a plurality of magnetic members 19 formed in a substantially circular arc shape is provided so as to correspond to respective drive coils 18, the plurality of the magnetic members 19 can be operated similarly to one piece of the magnetic member 19 which is formed in a substantially ring shape.

In the embodiment described above, the magnetic member 19 is disposed on the further inner side in the radial direction of the lens drive device 1 than the drive magnet part 17. However, the magnetic member 19 may be disposed on the further outer side in the radial direction of the lens drive device 1 than the drive magnet part 17. In this case, for example, the magnetic member 19 may be formed in the same shape as the coil protection member 20 so as to have the same function as the coil protection member 20. When the magnetic member 19 is formed in the same shape as the coil protection member 20, the coil protection member 20 is not required and thus the structure of the lens drive device 1 is simplified. In accordance with an embodiment of the present invention, the magnetic member 19 may be disposed on both of the inner side and the outer side in the radial direction of the lens drive device 1 with respect to the drive magnet parts 17.

In the embodiment described above, the magnetic member 19 is fixed to the end face on the object side of the slant face part 18b. However, the present invention is not limited to this embodiment. For example, a fixing part for the magnetic member 19 may be formed in the sleeve 8 and the magnetic member 19 is fixed to the fixing part only. Further, for example, the coil protection member 20 may be formed so as to cover the end face on the object side of the slant face part 18b and the magnetic member 19 is fixed to an object side face of the coil protection member 20.

In the embodiment described above, a length in the optical axis direction of the drive magnet piece 23 is longer than a length in the optical axis direction of the drive magnet piece 24. However, the present invention is not limited to this embodiment. For example, a length in the optical axis direction of the drive magnet piece 23 may be set to be equal to its length of the drive magnet piece 24 and, alternatively, a length in the optical axis direction of the drive magnet piece 23 may be shorter than a length in the optical axis direction of the drive magnet piece 24.

In the embodiment described above, when the movable body 2 is located at the reference position, the magnetic center position "CL1" of the drive magnet part 17 and the center position "CL2" of the drive coil 18 are displaced from each other. However, the present invention is not limited to this embodiment. For example, when the movable body 2 is located at the reference position, the magnetic center position "CL1" of the drive magnet part 17 and the center position "CL2" of the drive coil 18 may be coincided with each other. An attraction force generated between the magnetic center position "CL1" of the drive magnet part 17 and the magnetic member 19 decreases as a moving amount of the movable body 2 becomes larger. Therefore, a variation amount of a thrust force for the movable body 2 may be reduced during the moving range of the movable body 2 by utilizing this structure.

A thrust force for the movable body 2 can be optimized by setting a magnetic center position "CL1" of the drive magnet part 17, a length of the drive coil 18 in the optical axis direction, an arrangement position of the drive coil 18, a thickness of the magnetic plate 25, an arrangement position of the magnetic member 19, spring forces of the flat spring 5 and 6 and the like in a well balanced manner.

In the embodiment described above, the drive magnet part 17 and the drive coil 18 are disposed at four corners of the lens drive device 1. However, the present invention is not limited to this embodiment. For example, when a sufficient drive force for the movable body 2 can be obtained, the drive magnet part 17 and the drive coil 18 may be disposed at three or less, only one of four corners of the lens drive device 1. In this case, it may be structured that a guide shaft for guiding the movable body 2 in the optical axis direction is disposed at a corner part of the lens drive device 1 where the drive magnet part 17 and the drive coil 18 are not disposed and that an engaging recessed part which is engaged with the guide shaft is formed in the sleeve 8.

In the embodiment described above, the drive coil 18 is fixed to the movable body 2 and the drive magnet part 17 is fixed to the fixed body 3, but it may be structured that the drive magnet part 17 is fixed to the movable body 2 and the drive coil 18 is fixed to the fixed body 3. In the embodiment described above, the drive magnet part 17 and the drive coil 18 are disposed so that the magnetic member 19 is attracted toward an intermediate position of the drive magnet part 17 in the optical axis direction over the moving range of the movable body 2. However, the drive magnet part 17 and the drive coil 18 may be disposed so that the magnetic member 19 is attracted toward an object to be photographed or imaged side of the drive magnet part 17 when the movable body 2 is moved toward the object side.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device whose shape is substantially rectangular when viewed in an optical axis direction of a lens, the lens drive device comprising:
    a movable body which holds the lens and which is movable in the optical axis direction; and
    a drive mechanism for driving the movable body in the optical axis direction;
    wherein the drive mechanism further comprises:
        a drive magnet part which is formed in a substantially triangular prism shape and which is disposed at least one of four corners of the lens drive device;
        a drive coil which is wound around in a substantially triangular tube shape so that its inner peripheral face is oppositely disposed to an outer peripheral face of the drive magnet part through a gap space; and
        a magnetic member which is disposed on an object to be photographed or imaged side with respect to the drive coil; and
    wherein the drive magnet part is magnetized so that magnetic flux passing through the drive coil is generated at an opposite position to the drive coil; and
    wherein the magnetic member is attracted toward an intermediate position of the drive magnet part in the optical axis direction.

2. The lens drive device according to claim 1, further comprising a fixed body for movably holding the movable body,
    wherein the drive coil and the magnetic member are attached to the movable body and the drive magnet part is attached to the fixed body.

3. The lens drive device according to claim 2, wherein the magnetic member is disposed on an end face on the object to be photographed or imaged side of the drive coil.

4. The lens drive device according to claim 3, wherein
    the drive magnet part includes two drive magnet pieces which are formed in a substantially triangular prism shape and which are disposed so as to superpose on each other in the optical axis direction, and
    opposite faces in the optical axis direction of the two drive magnet pieces are magnetized in same magnetic pole as each other, and
    the magnetic member is attracted toward a portion between the two drive magnet pieces in the optical axis direction.

5. The lens drive device according to claim 4, wherein
    the two drive magnet pieces are a first magnet piece which is disposed on the object to be photographed or imaged side and a second magnet piece which is disposed on an opposite-to-object side,
    a length in the optical axis direction of the first magnet piece is longer than a length of the second magnet piece in the optical axis direction, and
    the magnetic member is disposed on the object to be photographed or imaged side with respect to an end face on the opposite-to-object side of the first magnet piece in the optical axis direction.

6. The lens drive device according to claim 4, wherein
    the drive magnet part is disposed at each of four corners of the lens drive device, and
    the magnetic member is formed in a substantially ring shape and is disposed on an inner side in a radial direction of the lens drive device with respect to the drive magnet part.

7. The lens drive device according to claim 6, further comprising an abutting member for abutting with the movable body which is urged in the optical axis direction by an attraction force generated between the drive magnet part and the magnetic member,
    wherein the drive magnet part and the drive coil are disposed so that, when the movable body is located at a reference position where the movable body is abutted with the abutting member, a magnetic center position of the drive magnet part in the optical axis direction is displaced from a center position of the drive coil in the optical axis direction, and so that, when the movable body is located at a predetermined position in a moving range of the movable body, the magnetic center position of the drive magnet part in the optical axis direction and the center position of the drive coil in the optical axis direction are coincided with each other.

8. The lens drive device according to claim 4, wherein a width of the drive coil in the optical axis direction is not less than a distance between the opposite faces of the two drive magnet pieces which are faced each other in the optical axis direction.

9. The lens drive device according to claim 1, wherein
    the drive magnet part includes two drive magnet pieces which are formed in a substantially triangular prism shape and which are disposed so as to superpose on each other in the optical axis direction, and
    opposite faces in the optical axis direction of the two drive magnet pieces are magnetized in a same magnetic pole as each other, and
    the magnetic member is attracted toward a portion between the two drive magnet pieces in the optical axis direction.

10. The lens drive device according to claim 9, wherein
    the two drive magnet pieces are a first magnet piece which is disposed on the object to be photographed or imaged side and a second magnet piece which is disposed on an opposite-to-object side,
    a length in the optical axis direction of the first magnet piece is longer than a length of the second magnet piece in the optical axis direction, and
    the magnetic member is disposed on the object to be photographed or imaged side with respect to an end face on the opposite-to-object side of the first magnet piece in the optical axis direction.

11. The lens drive device according to claim 9, wherein
    the drive magnet part is disposed at each of four corners of the lens drive device, and
    the magnetic member is formed in a substantially ring shape and is disposed on an inner side in a radial direction of the lens drive device with respect to the drive magnet part.

12. The lens drive device according to claim 11, further comprising an abutting member for abutting with the movable body which is urged in the optical axis direction by an attraction force generated between the drive magnet part and the magnetic member,
    wherein the drive magnet part and the drive coil are disposed so that, when the movable body is located at a reference position where the movable body is abutted with the abutting member, a magnetic center position of the drive magnet part in the optical axis direction is displaced from a center position of the drive coil in the optical axis direction, and so that, when the movable body is located at a predetermined position in a moving range of the movable body, the magnetic center position of the drive magnet part in the optical axis direction and the center position of the drive coil in the optical axis direction are coincided with each other.

13. The lens drive device according to claim 11, wherein the magnetic member is disposed on an end face on the object to be photographed or imaged side of the drive coil.

14. The lens drive device according to claim 1, wherein
the drive magnet part includes two drive magnet pieces which are formed in a substantially triangular prism shape and which are disposed so as to superpose on each other in the optical axis direction, and
opposite faces in the optical axis direction of the two drive magnet pieces are magnetized in a same magnetic pole as each other, and
the drive magnet part is disposed at each of four corners of the lens drive device.

15. The lens drive device according to claim 14, wherein
the two drive magnet pieces are a first magnet piece which is disposed on the object to be photographed or imaged side and a second magnet piece which is disposed on an opposite-to-object side, and
the magnetic member is disposed on the object to be photographed or imaged side with respect to an end face on the opposite-to-object side of the first magnet piece in the optical axis direction.

16. The lens drive device according to claim 15, wherein the magnetic member is disposed on an end face on the object to be photographed or imaged side of the drive coil.

17. The lens drive device according to claim 16,
wherein the movable body comprises:
a lens holder which is provided with a small diameter part on which a small diameter lens is mounted and a large diameter part on which a large diameter lens is mounted; and
a sleeve which holds the lens holder on its inner peripheral side;
wherein the sleeve is formed with a placing face on which the drive coil is placed at a boundary portion between the small diameter part and the large diameter part of the lens holder, and a placing face for disposing the magnetic member on the end face on the object to be photographed or imaged side of the drive coil.

18. The lens drive device according to claim 14, wherein a width of the drive coil in the optical axis direction is not less than a distance between the opposite faces of the two drive magnet pieces which are faced each other in the optical axis direction.

19. The lens drive device according to claim 1, further comprising an abutting member for abutting with the movable body which is urged in the optical axis direction by an attraction force generated between the drive magnet part and the magnetic member,
wherein the drive magnet part and the drive coil are disposed so that, when the movable body is located at a reference position where the movable body is abutted with the abutting member, a magnetic center position of the drive magnet part in the optical axis direction is displaced from a center position of the drive coil in the optical axis direction, and so that, when the movable body is located at a predetermined position in a moving range of the movable body, the magnetic center position of the drive magnet part in the optical axis direction and the center position of the drive coil in the optical axis direction are coincided with each other.

20. The lens drive device according to claim 19, wherein
when the movable body is located at the reference position, the center position of the drive coil in the optical axis direction is located on the opposite-to-object side with respect to the magnetic center position of the drive magnet part in the optical axis direction, and
when the movable body is located at a position nearest to the object to be photographed or imaged side, the center position of the drive coil is located on the object to be photographed or imaged side with respect to the magnetic center position of the drive magnet part.

21. The lens drive device according to claim 20, wherein
a magnetic pole different from magnetic poles of both ends in the optical axis direction of the drive magnet part is formed at an intermediate position in the optical axis direction of the drive magnet part, and
the magnetic member is attracted toward the magnetic pole formed at the intermediate position.

22. The lens drive device according to claim 21, wherein
the drive magnet part is provided with a first magnet piece which is disposed on the object to be photographed or imaged side, a second magnet piece which is disposed on an opposite-to-object side, and a magnetic plate which is sandwiched between the first magnet piece and the second magnet piece so that the first magnet piece, the magnetic plate and the second magnet piece are superposed on each other, and
opposite faces in the optical axis direction of the first drive magnet piece and the second magnet piece are magnetized in a same magnetic pole as each other, and
when the movable body is located at the reference position, the magnetic member is disposed in the optical axis direction on the object to be photographed or imaged side with respect to an end face on the opposite-to-object side of the first magnet piece and the magnetic member is attracted toward the magnetic plate.

\* \* \* \* \*